(12) United States Patent
Zouzal et al.

(10) Patent No.: US 10,455,945 B2
(45) Date of Patent: Oct. 29, 2019

(54) THORACIC REGION COMFORT SEATING SYSTEM

(71) Applicants: Winsen C. Zouzal, Detroit, MI (US); LEAR CORPORATION, Southfield, MI (US)

(72) Inventors: Winsen C. Zouzal, Detroit, MI (US); Ashford A. Galbreath, Troy, MI (US); Asad S. Ali, Troy, MI (US); Terry O'Bannon, Royal Oak, MI (US); Gerald S. Locke, Lake Orion, MI (US); Jennifer Badgley, Waterford, MI (US); Thomas S. Hicks, Livonia, MI (US); Walter T. Cichocki, Brighton Township, MI (US); Richard L. Harbaugh, South Lyon, MI (US)

(73) Assignee: Lear Corporation, Southfield, MI (US)

( * ) Notice: Subject to any disclaimer, the term of this patent is extended or adjusted under 35 U.S.C. 154(b) by 474 days.

(21) Appl. No.: 14/437,435

(22) PCT Filed: Oct. 23, 2013

(86) PCT No.: PCT/US2013/066365
§ 371 (c)(1),
(2) Date: Apr. 21, 2015

(87) PCT Pub. No.: WO2014/066493
PCT Pub. Date: May 1, 2014

(65) Prior Publication Data
US 2015/0272333 A1    Oct. 1, 2015

Related U.S. Application Data

(60) Provisional application No. 61/717,412, filed on Oct. 23, 2013.

(51) Int. Cl.
*A47C 7/46* (2006.01)
*B60N 2/66* (2006.01)

(52) U.S. Cl.
CPC .............. *A47C 7/46* (2013.01); *A47C 7/467* (2013.01); *B60N 2/66* (2013.01); *B60N 2/665* (2015.04); *B60N 2/666* (2015.04)

(58) Field of Classification Search
CPC .................................. A47C 7/46; B60N 2/665
(Continued)

(56) References Cited

U.S. PATENT DOCUMENTS

| 3,652,126 A | 3/1972 | Foiling |
| 4,690,456 A * | 9/1987 | Chiba .................... A47C 7/467 |
| | | 297/284.6 |

(Continued)

FOREIGN PATENT DOCUMENTS

| CN | 201941633 U | 8/2011 |
| CN | 102205807 A | 10/2011 |

(Continued)

OTHER PUBLICATIONS

Written Opinion and International Search Report of corresponding International Application No. PCT/US13/66365; 8 pages; dated Mar. 20, 2014.

(Continued)

*Primary Examiner* — Timothy J Brindley
(74) *Attorney, Agent, or Firm* — Brooks Kushman P.C.

(57) ABSTRACT

A thoracic support for a seat back of a seat is provided. The thoracic support structure is pivotally attached to the seat back and pivots between a first position and a second position. In the second position the support structure supports at least a portion of the thoracic region of the user's spine. An actuator disposed between a support surface and (Continued)

the support structure pivots the support structure from the first position to the second position upon actuation.

18 Claims, 2 Drawing Sheets

(58) Field of Classification Search
USPC .............................. 297/284.4, 284.6, 284.7
See application file for complete search history.

(56) References Cited

U.S. PATENT DOCUMENTS

| | | | |
|---|---|---|---|
| 5,076,643 A | 12/1991 | Colasanti et al. | |
| 5,137,329 A * | 8/1992 | Neale | A47C 7/467 297/284.1 |
| 5,651,583 A | 7/1997 | Klingler et al. | |
| 5,868,466 A * | 2/1999 | Massara | A47C 7/467 297/284.6 |
| 6,203,105 B1 | 3/2001 | Rhodes, Jr. | |
| 6,530,622 B1 | 3/2003 | Ekern et al. | |
| 7,841,663 B2 * | 11/2010 | Nathan | B60N 2/002 297/284.7 |
| 8,100,476 B2 * | 1/2012 | Jenkins | A47C 3/026 297/284.4 |
| 8,272,691 B2 * | 9/2012 | Hsuan-Chin | A47C 7/402 297/284.4 |
| 8,764,110 B2 * | 7/2014 | Hsuan-Chin | A47C 7/44 297/284.7 |
| 8,827,362 B2 | 9/2014 | Yamaki et al. | |
| 2001/0054836 A1 * | 12/2001 | Vik | A47C 7/46 297/284.8 |
| 2002/0195855 A1 * | 12/2002 | Teppo | A47C 7/462 297/284.6 |
| 2004/0194877 A1 | 10/2004 | Gupta et al. | |
| 2006/0103204 A1 | 5/2006 | Walker et al. | |
| 2006/0138832 A1 * | 6/2006 | Ogura | B60N 2/66 297/284.4 |
| 2007/0228790 A1 * | 10/2007 | Schurg | A47C 7/467 297/284.4 |
| 2008/0315650 A1 * | 12/2008 | Habegger | B60N 2/66 297/284.4 |
| 2009/0079245 A1 * | 3/2009 | Marcantoni | A47C 7/465 297/284.4 |
| 2009/0115235 A1 * | 5/2009 | Bock | A47C 7/462 297/284.7 |
| 2009/0127906 A1 * | 5/2009 | Sugiyama | B60N 2/66 297/284.4 |
| 2009/0212615 A1 * | 8/2009 | Maierhofer | A47C 7/465 297/284.4 |
| 2009/0243347 A1 | 10/2009 | Wilms | |
| 2010/0013283 A1 * | 1/2010 | Koike | B60N 2/66 297/284.4 |
| 2010/0164266 A1 * | 7/2010 | Walters | A47C 1/023 297/337 |
| 2010/0276974 A1 * | 11/2010 | Huttenhuis | A47C 7/42 297/284.3 |
| 2010/0283299 A1 * | 11/2010 | Onuma | B60N 2/002 297/337 |
| 2011/0006568 A1 * | 1/2011 | Hsu | A47C 4/54 297/217.3 |
| 2011/0031788 A1 * | 2/2011 | Kosik | A47C 3/0257 297/217.3 |
| 2011/0241403 A1 | 10/2011 | Yamaguchi et al. | |
| 2012/0007400 A1 * | 1/2012 | Behar | A47C 7/40 297/284.4 |
| 2012/0146376 A1 * | 6/2012 | Kang | A47C 7/402 297/284.7 |
| 2013/0145553 A1 | 1/2013 | Shih | |
| 2014/0062153 A1 * | 3/2014 | Grove | A47C 3/0252 297/284.4 |
| 2014/0167463 A1 * | 6/2014 | Sakata | B60N 2/0244 297/284.3 |
| 2015/0102647 A1 * | 4/2015 | Grove | A47C 7/46 297/284.4 |

FOREIGN PATENT DOCUMENTS

| | | |
|---|---|---|
| CN | 102458916 A | 5/2012 |
| CN | 102753387 A | 10/2012 |
| EP | 0662795 B1 | 7/1995 |
| TW | M433879 U | 7/2012 |
| WO | 2004/089693 A2 | 10/2004 |

OTHER PUBLICATIONS

European Search Report of corresponding application EP 13848883.8; dated Sep. 12, 2016; 8 pages.

Chinese First Office Action CN 201380047692.9; dated Jan. 4, 2017; 10 pages.

* cited by examiner

FIG. 1

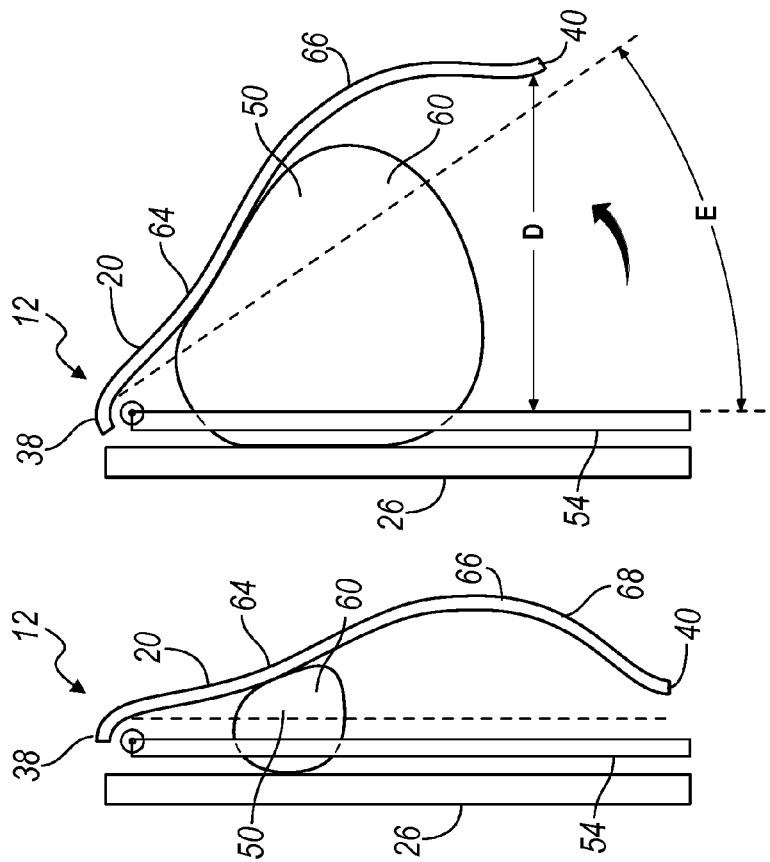
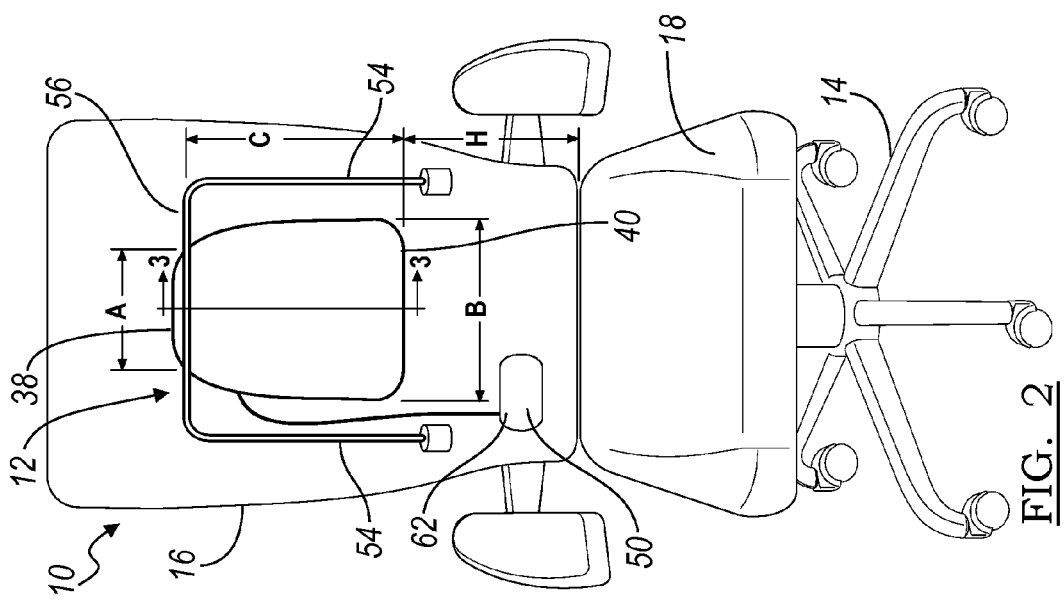

THORACIC REGION COMFORT SEATING SYSTEM

CROSS-REFERENCE TO RELATED APPLICATION

This application is the U.S. national phase of PCT Application No. PCT/US2013/066365 filed on Oct. 23, 2013, which claims the benefit of U.S. Provisional Patent Application No. 61/717,412 filed on Oct. 23, 2012, the disclosures of which are incorporated in their entirety by reference herein.

TECHNICAL FIELD

The present application is directed to a thoracic region comfort support system for a vehicle seatback.

BACKGROUND

In a seated position, the thoracic region of a person's spine is required to support much of the person's upper body mass. When seated in a vehicle seat, particularly for extended periods of time, the muscles of the person's upper body and vertebrae and discs in the lumbar region and pelvic region of the spine can become significantly fatigued.

BRIEF DESCRIPTION OF THE DRAWINGS

FIG. 1 illustrates a cut-away front perspective view of a portion of a seat assembly showing a thoracic support in accordance with one embodiment of the present disclosure;

FIG. 2 is a front perspective view of the exemplary seat assembly and thoracic support of FIG. 1;

FIG. 3 is a section view from FIG. 2 of a portion of the seat assembly showing a thoracic support in one position; and FIG. 4 is the section view from FIG. 2 showing the thoracic support in another position.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads are reduced on the muscles, vertebrae and discs in the lumbar region and pelvic region of the spine. Decreased load reduces fatigue on these areas of the body. The current prevalent comfort back supporting technology for the furniture and transportation market focuses on the lumbar (lower) region of the back to provide relief from fatigue. With the change from a primarily labor intensive work force to one of computer using desk workers we see an increase in upper back discomfort and a decrease in lower back discomfort. This is driving the need for an improvement in the location of the seating support system designed to provide relief for fatigue and the resultant discomfort.

A comfort seating system for seating for furniture or comfort vehicular seating systems, such as in office, automotive or aircraft seating, provides supporting pressure along the thoracic region of the user's spine between the T1 to the T12 vertebrae, and even to the L3 vertebrae.

The support structure is to be positioned along the thoracic region of a seat back when the user is seated. In at least one embodiment, the support structure has a harder center portion or centroid area, and softer side portions. In this embodiment, the center portion is intended to provide spinal support while the side portions are designed to allow the area along either side of the spine to sink in with less resistance than in the center portion. In at least this embodiment, the support structure is formed of different density and different hardness foams so that the center portion has a higher density and higher hardness foam than the foam forming the side portions. The support structure can be used in a variety of seating systems. Some exemplary seating systems and components are shown and described below.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. Smoothness of the pressure integral is accomplished by having a centroid of supporting high pressure with a lower pressure zone surrounding either side of the central support to promote a feeling of smooth transition from center to outer edges. In this manner, the occupant will experience relatively little discomfort from feeling the hardness transition between parts of the design. In addition, by supporting the thoracic region, the user's muscular ligamentous structures are supported which may increase biomechanical abilities and efficiencies for the muscular, physiological and neurological systems.

Sufficiency of the pressure change and the need to create even pressure for a wide range of anthropometry can be accommodated by either having the degree of pressure adjustable, or if not adjustable, designed design for a fiftieth male and female population location of the thoracic region, thereby minimizing the possibility of larger or smaller occupants experiencing discomfort. For instance, the range of T1 to T12 location from typical seat H-Point location by occupant is 204-466 mm for a small female, 241-507 mm for a mid-sized male, and 268-550 mm for a large male, based on crash dummy sizes; and seated height to shoulder of typical occupants is 538 mm for a small female, 604 mm for a mid-sized male, and 676 mm for a large male, (range=138 mm) (based on ANSUR data). In at least certain embodiments, the area of applied pressure moves within these ranges in order for each sized occupant to experience the desired support. In at least certain embodiments, any area great than 550 mm or less than 204 mm from the H-point, (Hip point measurement) of the seat would be considered higher or lower than needed. In at least one embodiment, the unit is centered in the seat and sized to accommodate a variety of occupant widths. Ergonomic control and suitability of actuation may be accomplished by having the ability to control pressure and location by adjusting the location and angular position of the unit up, down, forward and/or rearward.

Figure 1:
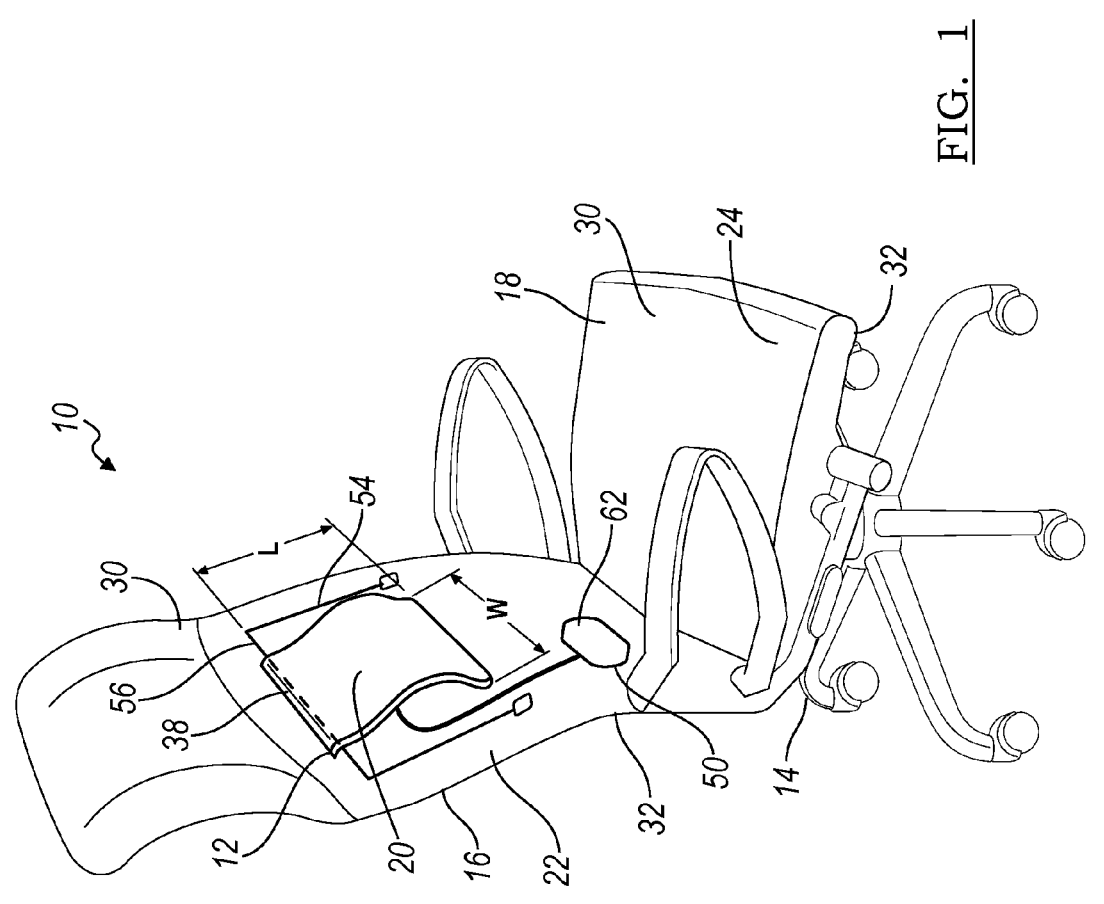

One concept, as shown in FIG. 1, seat assembly 10 to provides support the thoracic region of the user's spine and enhances the comfort of the user. FIG. 1 shows a cutaway of a seat assembly 10 having the support system 12 so that the thoracic support structure 20 is exposed.

The vehicle seat assembly 10 includes a seat back 16 and a seat bottom 18. The seat assembly 10 further includes a back foam cushion 22 and a seat foam cushion 24. The seat back 16 and seat bottom 18 may include the foam cushion or support structure conventionally secured to the seat frame 14 and/or a seat assembly infrastructure (not shown). The seat back 16 may be connected to a seat frame 14 for mounting in a vehicle. In another embodiment, the seat back 16 may be connected to a frame or base 14 of an office chair. The foam cushions or support structure may be secured to the seat frame 14 and/or infrastructure by any method generally known in the art, such as by an adhesive or fasteners, for example. While the seat assembly 10 is illustrated desk chair, it should be understood that the principles of the present disclosure are applicable to other types of seat assemblies, such as vehicle seats, and other types of seat assemblies.

The seat assembly 10 also includes a trim material adapted to cover the seat cushions and the thoracic support system 12. Typically, the thoracic support structure 20 is covered with material, such as leather, vinyl, cloth, or mesh, to coordinate color and style with the general theme of the seat back 16 of the office chair or vehicle seat to which the thoracic support structure 20 is provided on.

The trim material may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material may include a foam backing (not shown, but generally known in the art) which may be manufactured from a variety of polymer foam materials. By way of example, the foam backing may be polyethylene, polypropylene, polyurethane, or polystyrene foam. Optionally, a mesh or reinforcing material (not shown, but generally known in the art) such as fiberglass or nylon may be applied to the foam backing or back of the trim material for increasing strength without increasing rigidity.

The seat back 16 and seat bottom 18 each have seating surface 30 and a back surface 32 spaced from the seating surface 30. The seating surface 30 of the may be referred to as the "A" surface, and the back surface 32 may be referred to as the "B" surface. The back surface 32 of the seat back 16 may be formed by a support panel 26 having a support surface. The support panel 26 is discussed in more detail in FIG. 3-4.

The thoracic support structure 20 is pivotally attached to the seat back 16. The thoracic support structure 20 can pivot toward the seating surface 30 for supporting at least a portion of the thoracic region of the user's spine. The thoracic support structure 20 is hinged along a top surface 38. A bottom surface 40 of the thoracic support structure 20 pivots towards the user when the thoracic support structure pivots to a second position.

In at least one illustrated embodiment shown in FIG. 1, the thoracic support structure 20 has a width W that is general constant along a length L. The thoracic support structure 20 may have a width W of 15 cm to 30 cm and a length L of 15 cm to 40 cm, and in another embodiment, a width W of 10 cm to 15 cm and a length L of 15 cm to 25 cm.

In another embodiment shown in FIG. 2, the thoracic support structure 20 may have a top width A being less than a lower width B. In one embodiment, the thoracic support structure 20 the top width A is 7 cm to 25 cm and the bottom width B is 12 cm to 30 cm. In another embodiment, the thoracic support structure 20 has a top width A of 10 cm to 20 cm and the bottom width B is 15 cm to 25 cm. The thoracic support structure 20 having a base with a bottom width B wider than the top width A may have a length C being 15 cm to 35 cm, and in another embodiment, a length C of 20 cm to 30 cm.

An actuator 50 is disposed between the support surface and the support structure. Actuation of the actuator 50 pivots the thoracic support structure 20 from the first position to the second position. In one embodiment, a pair of support rods 54 is positioned in the seat back 16 and support the thoracic support structure 20. The pair of support rods 54 is connected by a cross-bar 56. The thoracic support structure 20 is mounted to pivot about the cross-bar 56. As shown in FIG. 3-4. The thoracic support structure 20 moves outward and upward toward the user. This results in an increase in pressure and support feeling in the thoracic region of the user.

The actuator 50 for moving the support structure between the first position and the second position is positioned between the support surface 26 and the thoracic support structure 20. In one embodiment, the actuator 50 is a pneumatic actuator.

The pneumatic actuator 50 may include a bladder 60 positioned adjacent to the thoracic support structure. The thoracic support structure 20 pivots when the bladder inflates. The bladder 60 is located to impart a supporting pressure to the thoracic vertebrae of the user. The pressure imparted is adjusted by the degree of inflation of the bladder 60 and accomplished by inflation mechanism 62. The inflation mechanism 62 may include a manual pump including but not limited to a bulb-type, handle driven or other pump designs. In this manner the user is able set the pressure to their preferred support pressure level. The bladder 60 may also be inflated with an automatic inflation mechanism. The automatic inflator may also be controllable by the user to set a preferred amount of support.

The bladder 60 or an inflatable chamber may be made of any suitable material that communicates with a pneumatic fluid source, such as air, to selectively fill the bladder 60 with air or other suitable fluid. In doing so, as the bladder 60 fills, the thoracic support structure 20 is urged forward away from the seating surface 30 of the seat back 16. As pressure builds in the bladder 60, an outer surface 64 of the thoracic support structure 20 is urged forward. In at least one embodiment, the pressure inside the inflated, or activated, actuator is 0.2 to 8 pounds per square inch (psi), and in at least another embodiment 0.2 psi to 5 psi.

As show in FIGS. 3-4, as the bladder 60 is inflated, the thoracic support structure 20 is a distance D. The thoracic support structure 20 may pivot so that the bottom surface moves a distance D being between 15 mm and 75 mm in a second deployed position, to cause pressure in the thoracic region area of a user's spine. Alternatively, the thoracic support may pivot an angle E. The thoracic support may pivot from zero degrees in the first retracted position to a second deployed position between 10 degrees to 50 degrees.

In one embodiment, the thoracic support structure 20 may have a generally planar outer surface 64. In another embodiment, shown in FIGS. 3-4, the thoracic support structure has an outer surface 64 with a curved profile in an upright direction. The curved profile includes a convex portion 66 that pivots to contact the thoracic region of the user's spine in the second position. The convex portion 66 is formed adjacent the bottom surface 40. In at least one embodiment, the outer surface has a compound curve shape that forms apex point 68 and a more pronounced protrusion at a position one-third (⅓) of the overall distance from the bottom surface 40. This curved shape is intended to lift and support in thoracic region of the user's back.

The seat back 16 extends in the upright direction from the seat bottom 18. The thoracic support structure 20 is positioned at a height H above the seat bottom 18 in the upright direction in order to align with at least a portion of the user's thoracic region. The bottom surface 40 of the thoracic support structure 20 is positioned at the height H having a range of 15 cm to 35 cm above the seat bottom 18. The height H the thoracic support structure 20 may be adjustable along the support rods 54. For example, the thoracic support structure 20 may have a range of travel along the support rods 54 in the upright direction of 5 cm to 20 cm.

The seat back 16 is formed of a material having a first hardness and the thoracic support structure 20 is formed of a second hardness being greater than the first hardness in order to provide support the portion of the user's thoracic region. As such, the thoracic support structure 20 may provide support to the user even in the first retracted position.

The details, designs, variants, aspects and embodiments shown and described herein are applicable to automotive, other vehicular and non-regulated seating. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat comprising:
   a seatback including a support surface, wherein the seatback extends in an upright direction from a seat bottom;
   a thoracic support structure pivotally attached to the seatback adjacent a top surface of the support structure for movement between a first position and a second position, wherein a bottom surface of the support structure is positioned at a height above the seat bottom in the upright direction in order to align the bottom surface with at least a portion of a user's thoracic region; and
   an actuator disposed between the support surface and the support structure, wherein actuation of the actuator pivots the support structure from the first position to the second position, wherein in the second position the bottom surface moves away from the seatback so the thoracic support structure lifts and supports at least a portion of the thoracic region of the user's spine.

2. The seat according to claim 1 wherein the height above the seat bottom in the upright direction is at least 200 millimeters (mm) in order to align with the portion of the user's thoracic region.

3. The seat according to claim 2 wherein the first position, the bottom surface of the thoracic support structure is positioned at the height having a range of 200 mm to 350 mm.

4. The seat according to claim 1 further comprising a support rod positioned in the seatback and supporting the thoracic support structure, wherein the height is adjustable along the support rod.

5. The seat according to claim 1 further comprising a pair of support rods positioned in the seatback and supporting the thoracic support structure, wherein the pair of support rods are connected by a cross-bar and the thoracic support structure is mounted to pivot about the cross-bar.

6. The seat according to claim 1 wherein the seatback is formed of a material having a first hardness and the thoracic support structure is formed of a second hardness being greater than the first hardness in order to provide support the portion of the user's thoracic region.

7. The seat according to claim 1 wherein the actuator is a pneumatic actuator.

8. The seat according to claim 7 wherein the pneumatic actuator includes a bladder positioned adjacent to the thoracic support structure, wherein the thoracic support structure pivots when the bladder inflates.

9. The seat according to claim 1 wherein the seatback is adapted to be connected to a seat frame for mounting in a vehicle.

10. The seat according to claim 1 wherein the seatback is adapted to be connected to a base of an office chair.

11. A thoracic support for a seatback of a seat, the thoracic support comprising:
    a support structure pivotally attached to the seatback adjacent a top surface of the support structure for movement between a first position and a second position, the support structure having curved shape with an apex point along a protrusion formed adjacent a bottom surface;
    an actuator disposed between the seatback and a support surface disposed in the seat back,
    wherein actuation of the actuator pivots the support structure from the first position to the second position, wherein in the second position the bottom surface moves away from the seatback so the protrusion of the thoracic support structure pivots to lift and contact at least a portion of the thoracic region of the user's spine.

12. The thoracic support of claim 11 wherein the support structure is rigid and the protrusion is formed in the rigid support structure.

13. The thoracic support of claim 11 further comprising a pair of support rods adapted to be positioned in the seatback and supporting the support structure, wherein the pair of support rods are connected by a cross-bar and the support structure is mounted to pivot about the cross-bar.

14. The thoracic support of claim 11 wherein the actuator includes a pneumatic actuator.

15. The thoracic support of claim 14 wherein the pneumatic actuator includes a bladder positioned adjacent to the support structure, wherein the thoracic support structure pivots when the bladder inflates.

16. A thoracic support for a seatback of a seat, the thoracic support comprising:
    a support structure pivotally attached to the seatback adjacent a top surface of the support structure and having a curved profile in an upright direction, the curved profile including a convex portion having an apex point along a lower region of the support structure; and an actuator operatively connected to the support structure, wherein actuation of the actuator pivots the support structure from a first position to a second position, wherein, wherein in the second position, the bottom surface moves away from the seatback and the support structure pivots to contact and lift at least a portion of a thoracic region of the user's spine along the convex portion of the curved profile.

17. The thoracic support of claim 16 wherein the convex portion formed adjacent the bottom surface.

18. The thoracic support of claim 17 wherein the apex is formed along a bottom-third of the support structure.

\* \* \* \* \*